United States Patent

[11] 3,616,191

[72] Inventors James J. Fuerholzer
Crystal Lake;
Neal G. Reddeman, Wauconda; Samuel Zweig, Skokie, all of Ill.
[21] Appl. No. 686,427
[22] Filed Nov. 29, 1967
[45] Patented Oct. 26, 1971
[73] Assignee Morton International, Inc.

[54] LOW TEMPERATURE EXTRUSION PRIMER
33 Claims, 2 Drawing Figs.
[52] U.S. Cl. .................................................. 161/190,
161/218, 161/251, 161/252, 161/254, 156/244, 156/331, 156/332, 260/859
[51] Int. Cl. .......................................................... B32b 27/08, B32b 27/40
[50] Field of Search ........................................... 161/190, 252, 254, 218, 251, 244; 156/332, 331; 260/859

[56] References Cited
UNITED STATES PATENTS

| | | | |
|---|---|---|---|
| 3,024,216 | 3/1962 | Smitmans et al. | 260/859 |
| 2,341,398 | 3/1939 | Strother et al. | 156/332 X |
| 2,543,229 | 2/1951 | Chapman | 161/254 X |
| 2,909,443 | 10/1959 | Wolinski | 161/254 X |
| 2,964,422 | 12/1960 | Bergstedt et al. | 117/76 |
| 3,067,085 | 12/1962 | Limperos | 161/254 X |
| 3,232,789 | 2/1966 | Pelzek et al. | 117/138.8 |
| 3,264,272 | 8/1966 | Rees | 260/78.5 |
| 3,340,091 | 9/1967 | Zweig | 161/252 X |
| 3,371,002 | 2/1968 | Reddeman | 161/247 X |
| 3,453,173 | 7/1969 | Isley et al. | 161/190 |

Primary Examiner—John T. Goolkasian
Assistant Examiner—C. B. Cosby
Attorney—Hofgren, Wegner, Allen, Stellman & McCord ABSTRACT: A method of obtaining improved adhesion of extruded olefin polymer coating materials to packaging material substrates, involving the use of a hydrolyzed copolymer of an olefin and ester of an unsaturated alcohol, e.g., an ethylene-vinyl acetate copolymer, or isocyanate reaction product thereof, as an adhesion improving primer or tie coat which permits extrusion of the coating material onto the primed surface at a lower temperature than ordinarily required, resulting in a better bond of coating material to substrate than ordinarily obtained at those lower temperatures.

PATENTED OCT 26 1971

3,616,191

INVENTORS.
JAMES J. FUERHOLZER
NEAL G. REDDEMAN
SAMUEL ZWEIG

BY Hofgren, Wegner, Allen, Stellman & McCord.

ATTORNEYS.

LOW TEMPERATURE EXTRUSION PRIMER

BACKGROUND OF THE INVENTION

1. Field of the Invention

This invention relates to methods of coating substrates with olefin polymer materials which are normally difficult to secure to a substrate by applying from a hot melt without encountering oxidative deterioration of the coating material.

2. Description of the Prior Art

Conventional hot melt coating processes are used to coat packaging material substrates, e.g., paper, paper board, aluminum foil, cellophane, nylon, and the like, with such olefin polymers as polyethylene, for the purpose of imparting heat seal properties, grease resistance properties and moisture barrier properties to the packaging material. For example, in one form of hot melt coating, i.e., an extrusion coating process, polyethylene coating material is heated to a temperature high enough to cause formation of a viscous fluid and is extruded from the viscous fluid state through a die onto the substrate. Alternatively, hot melt coating can be conducted by applying the viscous fluid or polymer melt by means of roller coating, flow coating, calendering, or spraying operations.

Many of the coating materials which are desirable for imparting the heat-seal and moisture barrier properties to a substrate are difficult to apply by using hot-melt processes. For example, in the case of olefin polymers such as polyethylene and copolymers of ethylene, it is necessary to heat the polymer melt to a very high temperature, e.g., above about 575° F. for polyethylene, before the coating material will adhere adequately to the substrate. This is true even when conventional primers are used on the substrate. At such high temperatures, olefin polymers are oxidized with concomitant thermal degradation of the polymer, e.g., by depolymerization and/or an objectionable amount of cross-linking. Oxidation is required to increase functionality or polarity of the material to obtain a reasonable bond of the polyolefin to the substrate; however the oxidation also introduces undesirable properties. For example, a characteristic objectionable "off" odor is produced which creates a serious problem in using the resulting laminate as a food packaging material; such "off" odors are absorbed by the packaged food product. Another objectionable characteristic of the coating material which has been heated to such elevated and oxidizing temperatures is an increase in the temperature required for heat sealing. Additionally, use of higher temperature melts for coating limits the type of substrate which can be coated with the coating material since the substrate must be able to resist the adverse effects of the higher temperatures.

Even further disadvantages can result from high-temperature extrusion as practiced heretofore. For example, where polyethylene is used as the coating material, the high-temperature extrusion results in the formation of objectionable volatile decomposition products in the vicinity of the extruder and this presents problems of quality control and equipment maintenance. Also, in the case of polyethylene, films are sometimes difficult to secure to substrates even when using the high-temperature extrusion, especially when the extruded film thickness is about two mils or less; the thinner films have less heat-holding capacity and the lesser heat-holding capacity conversely requires higher extrusion temperatures to compensate therefor and this further compounds the high temperature odor problem and general deterioration of the extruded coating material. Additionally, higher processing web speeds used for economical production also require increased extrusion temperatures, again with undue oxidation and malodor.

Where such ester-containing copolymers as ethylene-vinyl acetate copolymers are used as coating materials, the presence of the ester group apparently lowers the temperature at which the undesirable odors are produced by decomposition or degradation. As the ester content is increased in such copolymers, the desirable extrusion temperature limit is further decreased. Thus, in spite of the polar nature of such copolymers, it has been difficult to bond them with good bonding strength to packaging substrates and the polymer decomposition and odor problem prevails.

The heat required for adhesion of an untreated olefin polymer coating to a substrate at least approaches the temperatures at which odors result, usually by oxidation and/or decomposition of the polymer. The copolymers, containing significant amounts of ester groups, so far as is known, cannot be adhered to a substrate by extrusion or the like without encountering the problem of malodor because the minimum temperature required for satisfactory adhesion is at least about the same as the decomposition temperature at which the odors are produced. Where such polyolefins as untreated polyethylenes are used as coating materials, the extrusion temperatures are defined by a relatively narrow range and temperature control therefor is a serious problem; temperature control within the range is difficult because of the high processing speeds desired for economic commercial production and the limitation of the equipment, among other reasons.

Often, such olefin polymers as polyethylene, polypropylene, ethylene-vinyl acetate copolymer, etc., are mixed with waxes and the mixture is applied from a melt, but it is still difficult to obtain adherence of the coating to the substrate below the oxidation temperature of the olefin polymer component.

SUMMARY OF THE INVENTION

The present invention provides a method which can be used to adhere an olefin polymer coating to a substrate from a melt at temperatures below those at which the olefin polymer of the coating material may become materially oxidized and/or decomposed and without requiring artificial oxidation of the surface. According to the present method, before applying the hot coating material, the surface of the substrate is primed with a hydrolyzed copolymer of an olefin and an ester of vinyl alcohol. A hot melt of the coating material is applied over the primer, but the coating material need not be heated to such extreme temperatures as will cause oxidation of the material. The resulting coated substrate is generally free from malodors which are produced by the elevated temperatures and the coated material is entirely acceptable as a packaging material. Additionally, the coating retains its heat-sealability and the method eliminates the quality control and equipment maintenance problems associated with production of volatile decomposition products in the vicinity of the coating equipment.

FURTHER DESCRIPTION OF THE PREFERRED EMBODIMENT

Figure 1:
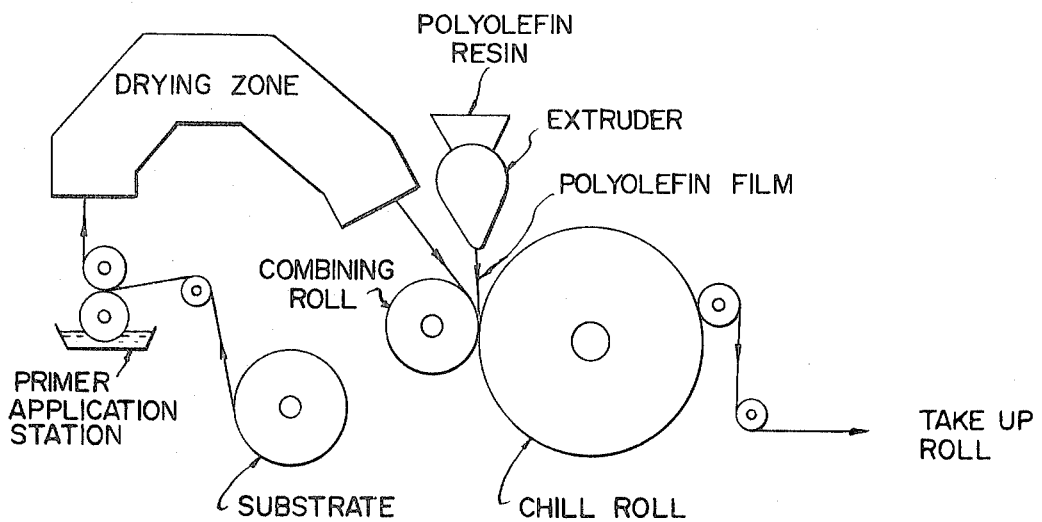
FIG. 1 of the drawing is a block flow diagram of equipment suitable for carrying out a preferred form of the process of this invention.
Figure 2:
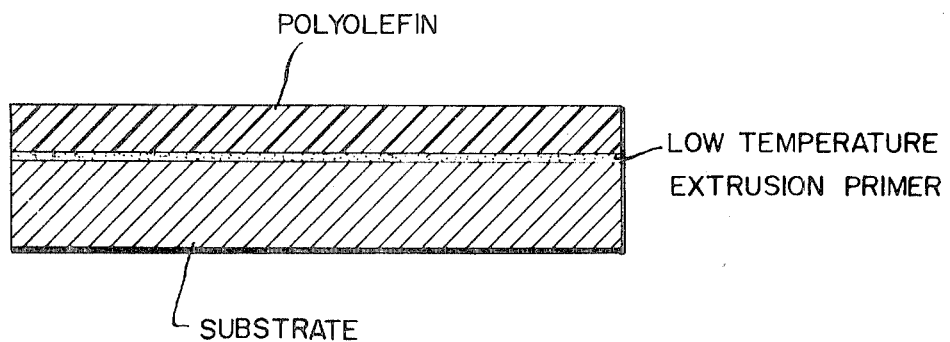
FIG. 2 is an enlarged cross section of a laminate including a substrate which is primed and coated with an olefin polymer coating in accordance with a preferred form of the invention.

The hydrolyzed copolymer used as the primer in the method is a hydrolyzed copolymer of one or more olefinic monomers and one or more ester monomers. The olefin monomers are usually ethylene or propylene because of the availability of such copolymers, although it is contemplated that copolymers of any olefin, e.g., in the $C_2$ to $C_6$ range or higher, such as butylene, isobutylene and 1-hexene, can be used. The ester monomer is an ester of an acid and vinyl alcohol or substituted vinyl alcohol, especially including the analogues of vinyl alcohol. The olefin monomer and ester monomer are, of course, copolymerizable to form the copolymer. The nature of the acid in the ester monomer is not believed to be critical because acid groups are removed during hydrolysis and if the acid groups are of a structure impairing any desired properties of the copolymer, the amount of acid groups present can be regulated initially or decreased by increased hydrolysis. Usually, the acid of such a copolymerizable ester will be of low molecular weight, and vinyl acetate is a particularly preferred ester. The useful copolymers are well known and some are commercially available.

In the method, the hydrolyzed copolymer is applied in an amount sufficient to improve the adhesion of the coating material to the substrate. Because only a very small amount of the hydrolyzed copolymer is needed to prime the surface, the copolymer is usually applied in a diluted form such as in solution in a suitable volatile solvent. For use in solution, the copolymer will usually contain at least 8 percent to 10 percent by weight units derived from the unsaturated ester since copolymers containing a lesser amount of such units are relatively insoluble. Also, copolymers containing over 50 percent by weight of the ester units do not have as good adhesive characteristics; the preferred hydrolyzed copolymer has no more than about 40 percent by weight ester units. Suitable volatile solvents for the hydrolyzed copolymer are well known in the art and include, among others, the aromatic hydrocarbon solvents such as toluene which is readily available.

One particular class of hydrolyzed copolymer has been found to be especially advantageous when used as the primer in the method of this invention. This is the hydrolyzed interpolymer of ethylene and vinyl acetate which is reported as having the empirical formula $(C_2H_4)x$ $(C_2H_3OH)y$ $(C_2H_3OCOCH_3)z$, in which $x$, $y$, and $z$ are numbers, the ratio on a weight basis of $x$ to $y$ being within the range of form about 5:1 to about 300:1, and the ratio of $x$ to $z$ being within the range of from about 1:1 to about 10:1. Alternatively or additionally, reaction products of the hydrolyzed interpolymers, e.g., from reaction with organic isocyanates, can be used especially to provide cross-linked reaction products which have enhanced resistance to solvent and chemical attack.

The process of the present invention involves coating a packaging substrate with the hydrolyzed copolymer or interpolymer primer and thereafter applying, from a hot melt, an olefin polymer coating material at a temperature appreciably lower than the oxidation temperature of the olefin polymer in the coating material.

In a preferred embodiment, the present invention comprises a method of adhering a polyethylene film or other olefin polymer coating material to a flexible packaging substrate to provide an improved polyethylene coated product. The substrate is first primed, e.g., by spraying, slushing, immersing, roller coating, or otherwise (a) applying a primer containing an interpolymer or isocyanate reaction product thereof wherein the interpolymer has the structure of $(C_2H_4)x$ $(C_2H_3OH)y$ $(C_2H_3OCOCH^3)z$ wherein $x$, $y$, and $z$ are numbers, the ratio on a weight basis of $x$ to $y$ being within the range of from about 30:1 to about 70:1, and the ratio of $x$ to $z$ being within the range of from about 1:1 to about 10:1, and (b) after the surface is primed, the coating material is applied. Preferably this is by extruding onto the primed surface of the substrate a polyethylene melt so as to form a film having a thickness of from about 0.1 to about 10 mils at a melt temperature significantly lower than the oxidation temperature of polyethylene and usually at a temperature less than about 575° F. as taken at the adapter or die lands of the extruder.

Any of the flexible wrapping materials commonly used in the packaging art are suitable substrates in the practice of this invention. Thus, for example, Kraft paper, paperboard, glassine, aluminum foil, polypropylene film, regenerated cellulose, polyamide film, polyester film such as for example Mylar, cellulose acetate, polyvinyl chloride, and polyvinylidene chloride are only exemplary of the many substrates which may be extrusion coated or hot melt coated by the use of the primers employed in the invention.

PREPARATION OF HYDROLYZED ETHYLENE-VINYL ACETATE COPOLYMERS

The hydrolyzed interpolymers of the low temperature polyolefin extrusion primers are prepared by hydrolyzing ethylene-vinyl acetate copolymers, usually having a vinyl acetate content ranging on a weight basis from about 15 to about 50 percent. These ethylene-vinyl acetate copolymers are available commercially under a variety of trade names. Controlled hydrolysis of these copolymers may be carried out according to the following procedure to yield an interpolymer having virtually any desired degree of hydrolysis.

As a typical example of such preparation, a solvent mixture of 75 parts by volume of toluene and 25 parts by volume of isopropanol is neutralized with alcoholic potassium hydroxide to the phenolphthalein end point. Ethylene vinyl acetate copolymer is added to and dissolved in the neutralized solvent, with efficient stirring and warming to effect complete solution of the copolymer. The theoretical amount of aqueous sodium hydroxide is added to yield an interpolymer having the desired degree of hydrolysis. The reaction mixture is then heated to reflux temperature under continuous stirring until the completion of the reaction which is indicated by a change in color of the phenolphthalein indicator from pink to colorless. The solvents are then distilled from the reaction mixture until the temperature of the distillate vapor is about 100° C. At the end of the distillation the solids level of the reaction mixture is from about 30 to 35 percent. At this point, if desired, the hydrolyzed interpolymer may be isolated by precipitation with methanol. The precipitate can be washed free of impurities and dissolved in a solvent of choice. However, it has been found expedient not to isolate the hydrolyzed interpolymer but simply to dilute the reaction mixture with a suitable solvent such as toluene to a 10 percent solids content to form a convenient low temperature, extrusion primer-use solution. By this method, ethylene-vinyl acetate copolymers have been hydrolyzed such that from about 3 percent to about 40 percent of the acetate groups are replaced by hydroxyl groups, as desired.

PREPARATION OF INTERPOLYMER REACTION PRODUCTS

The hydrolyzed ethylene-vinyl acetate interpolymers may be further reacted with other ingredients, usually an isocyanate, including diisocyanates and other polyisocyanates. The reaction with polyisocyanate provides cross-linked products which also serve as low temperature extrusion primers but have the further advantage of enhanced chemical resistance compared with the nonreacted interpolymers. Any isocyanate or isocyanate polymer, prepolymer or adduct having available isocyanate groups is useable for reaction with the hydrolyzed ethylene-vinyl acetate copolymers. By the way of example but not limitation, some of the operable diisocyanates including toluene diisocyanates, tetramethylene diisocyanate, hexamethylene diisocyanate and 4, 4', 2, 4', and 2,2'-diphenylmethane diisocyanate and adducts of these diisocyanates with diols, triols, and polyols derived from polyethers and polyesters and the like. Polyols of such adducts with di or poly-isocyanates include trimethylolpropane, trimethylolethane, glycerol, 1,2,4-trihydroxybutane, triethanolamine, ethylene glycol, propanediol-1,3, butanediol-1,4, hexanediol, methylhexanediol, diethyleneglycol, polyethers, polyesters, and mixtures thereof.

COATING PROCEDURE

By the use of the aforedescribed primers, it was found possible to carry out an olefin polymer extrusion coating process at temperatures as low as the flowing point of the particular coating resin or polymer being used, e.g., from about 375° F. to about 560° F. or higher or lower, depending on the coating resin being used. By "flowing point" is meant that temperature at which a resin is sufficiently mobile to flow through the lips of an extruder die and onto a substrate. Primer coating weights of from about 0.1 lb. to about 1.5 lb. per ream of 3,000 square feet of substrate are sufficient to anchor or bond olefin polymer films having a thickness of from about 0.1 to about 10 mils to packaging substrates. Bond strength measurements, hereinafter described, attest to the effectiveness of the extrusion-coated packaging materials produced by the practice of the present invention. The invention is applicable to extrusion coating by olefin polymers, and particularly by polyethylene or copolymers of ethylene with such ester monomers as vinyl acetate methyl acrylate, etc., and by all types commonly used for coating applications. These olefin polymers will hereafter be termed herein "polyolefins." For example, the invention can be successfully practiced with films made of the polyethylenes of the conventional branches type having such different properties as are tabulated in table I.

TABLE I. Representative Suitable Polyethylenes

| Polymer No | Density | Melt Index* |
|---|---|---|
| 1 | 0.917 | 3.4 |
| 2 | 0.923 | 3.1 |
| 3 | 0.915 | 23.0 |
| 4 | 0.930 | 3.0 |
| 5 | 0.923 | 8.0 |
| 6 | 0.918 | 10.0 |

*The term "Melt Index" is a standard measure of the melt viscosity of polyethylenes and is expressed as the number of grams flowing through a standard orifice in a unit of time at a standard temperature and pressure.

Polymers 1, 3, and 6 are in the low-density range but vary in melt index from very low to very high. Polymer 4 is an intermediate density branches polymer, near the upper end of the density range for commercial branched polyethylenes. The other polymers are intermediate to these in density.

The invention is applicable to coating with various other polyolefins such as polypropylene, polybutene, etc., copolymers of olefins such as ethylene or propylene with each other or with vinyl acetate, acrylic acid, methacrylic acid, methyl acrylate, ethyl acrylate, isobutyl acrylate, vinyl chloride, methyl methacrylate, tetrafluoroethylene, butene-1, or to coating with ionomer olefin copolymer resins such as ethylene-acrylic acid copolymers, or ethylene-ethyl acrylate-acrylic acid terpolymers, and other olefinically unsaturated monomers respectively, all of which are included in the expression "polyolefin" or "polyolefin resin" as used herein in identifying the coating material The advantages of the invention are best realized when the film is a heat-sealable polymer film formed from a monomer consisting predominantly of a lower olefin, that is, an olefin having two, three, or four carbon atoms. While ordinarily branched chain, low density resins would be used, important advantages are realized with films of high-density resins, linear resins, and stereospecific resins. It is normal practice in the art to extrude these resins or melt temperatures in the range of from about 575° F to about 625° F. The use of the aforedescribed primers permits efficient extrusion coating by these resins at temperatures as low as the flowing point of each resin.

Typical Extrusion Coating Process

The extrusion coating process employed in the following examples of this invention may be more clearly understood by reference to FIG. 1. The extruder there shown is surmounted by a hopper containing the polyolefin resin to be extruded. In this process the extruder melts and continuously applies a controlled amount of polyolefin resin directly onto the primed web or substrate being coated. As is seen, the substrate material is fed from a substrate roll to the primer application station where it receives a coating of primer. The primecoated substrate is then passed through a drying zone to evaporate volatile solvents and thence over a combining roll where a curtain of extruded polyolefinic resin falls directly onto the primed substrate. The polyolefin coats out on the substrate as the coating material and substrate pass through the nip formed by the combining roll and a chill roll whereby a polyolefin-coated substrate is formed. The coated substrate is then wound onto a take-up roll for storage as desired In addition to coating material temperature, other factors which influence the strength of the bond obtained in a polyolefin extrusion coating process are the temperature of the web surface, the thickness of the polyolefin film being applied, the length of the airgap between the lip of the extruder and the nip of the pressure rolls, and the rate of speed of the substrate as it comes into contact with the extruded polyolefin.

Proper web surface temperature can be maintained by using a web preheat roll in the web feed system. Cold air blasts in the vicinity of the airgap should be minimized. In many instances, minimizing the distance between the die lips and the nip is also helpful. The speed of the substrate web and the thickness of the polyolefin film can be adjusted to maximize bond strength in a given coating operation.

The examples, given below, which are illustrative and are not intended to limit the scope of this invention in any manner, clearly show the excellent adhesion of polyolefin films to a variety of substrates obtained by the use of the present low-temperature extrusion primers at temperatures significantly lower than the polyolefin oxidizing temperature.

In the examples enumerated below, unless otherwise indicated, the substrates were coated with a 10 percent solution of the copolymer in toluene to provide a primer coating having a coat weight of about 0.3 to 0.6 lbs. of solids per ream of the substrate surface. All coat weights are reported as lbs. solids per ream, after vaporization of solvent. The primed sheets were then fed under an extruder die and coated with the polyolefin melt at a melt temperature of 490° F. or other temperature as indicative in the examples. The polyolefin coating material was applied at approximately a 1 mil. thickness from the extruder as a film.

The coated substrates were tested for tensile strength of the bond between the coating and substrate materials and these results are reported for the examples below. Usually the tests showed a tensile strength greater than 200 grams per inch. The tests were made after the coated substrates were permitted to age at ambient room temperature for 24 hours and/or 3 weeks or at other aging times as indicated in the reported results. The tensile strength of the bond was determined by an Instron tensile tester which is conventionally used in the packaging industry to determine bond strengths. Briefly, the tensile tester includes a pair of vertically opposed clamps or jaws, one for clamping the substrate and the other for clamping the coating. The lower jaw is secured to a moving crosshead which is driven away from the upper jaw at a constant rate of speed. The upper jaw is associated with an electronic device which detects and records the load applied in units of weight or the force required to break the bond. Unless otherwise indicated, the control was a coated substrate prepared in the same manner as the coated substrates of the invention with the exception that a polyethyleneimine primer was used in lieu of the hydrolyzed interpolymer primer. Polyethyleneimine is a conventional primer for use in high temperature extrusion processes, e.g., at the higher oxidation or decomposition temperature. Where a plurality of substrates is indicated as having been coated using the primer of the examples and only one control is reported, the reported control bond strength is the average bond strength for controls embodying all of the same substrates used in preparing the laminates of the invention in that example.

The illustrative examples include the following:

EXAMPLE 1

Ethylene-vinyl acetate copolymer of 82 percent by weight of ethylene and 18 percent by weight of vinyl acetate was hydrolyzed according to the aforedescribed hydrolysis procedure to provide hydrolyzed ethylene-vinyl acetate interpolymer having the following compositions respectively:

| Primer | Percent Hydrolysis | Ethylene | Vinyl acetate | Vinyl alcohol | E/VAc[1] | E/VA[2] |
|---|---|---|---|---|---|---|
| A[3] | | | | | | |
| B | 3 | 82.2 | 17.5 | 0.3 | 4.70 | 274 |
| C | 9 | 82.7 | 16.5 | 0.8 | 5.0 | 104 |
| D | 13 | 83.0 | 15.6 | 1.4 | 5.3 | 58 |
| E | 32 | 84.4 | 12.6 | 3.0 | 6.7 | 28 |
| F | 41 | 85.1 | 11.0 | 3.8 | 7.7 | 22 |

[1] E/VAc is the ratio of ethylene (E) to vinyl acetate (VAc).
[2] E/VA is the ratio of ethylene (E) to vinyl alcohol (VA).
[3] Control-polyethyleneimine.

The Instron tensile tester results are as reported in table I.

TABLE I (K Cellophane Substrate)

Bond Strength g./in.

| Primer | 24 Hours | 3 |
|---|---|---|
| No primer | 0 | 0 |
| A (Control) | 0 | 0 |
| B | 290 | 480 |
| C | 340 | 395 |
| D | 235 | 395 |
| E | 450 | * |
| F | 225 | * |

*measurements not made

EXAMPLE 2

Each of the hydrolyzed interpolymer primers of example 1 was coated onto glassine according to the method described above, and thereafter extrusion coated with polyethylene at 490° F. The results of bond measurements appear in table 2.

TABLE 2 (Glassine Substrate)

Bond Strength g./in.

| Primer | 24 Hours | 3 Weeks |
|---|---|---|
| No Primer | 0 | 0 |
| A (Control) | 0 | 0 |
| B | 285 | 365 |
| C | 265 | 355 |
| D | 380 | 300 |
| E | * | * |
| F | 370 | 555 |

*measurements not made

EXAMPLE 3

Each of the hydrolyzed interpolymer primers of example 1 was coated onto aluminum foil according to the method described above and thereafter extrusion coated with polyethylene at 490° F. The results of bond measurements appear in table 3.

TABLE 3 (Aluminum Foil Substrate)

Bond Strength g./in.

| Primer | 24 Hours | 3 Weeks |
|---|---|---|
| No Primer | 0 | 0 |
| A (Control) | 0 | 0 |
| B | 590 | 330 |
| C | 560 | 795 |
| D | 560 | 485 |
| E | 465 | 610 |
| F | 470 | 400 |

It is seen from the preceding results that 1. a primer is necessary for adhesion and that 2. under the low-temperature conditions employed, the primers of this invention are remarkably effective whereas the widely used polyethyleneimine provides little or no adhesion.

EXAMPLE 4

An ethylene-vinyl acetate copolymer of 72 percent by weight of ethylene and 28 percent by weight of vinyl acetate was hydrolyzed as heretofore described to provide hydrolyzed ethylene-vinyl acetate interpolymer primers having the following compositions:

| Primer | Percent Hydrolysis | Ethylene | Vinyl acetate | Vinyl alcohol | E/VAc | E/VA |
|---|---|---|---|---|---|---|
| H | 10 | 73.0 | 25.6 | 1.4 | 2.86 | 52 |
| I | 12.5 | 73.2 | 25.0 | 1.8 | 2.92 | 41 |
| J | 16 | 73.7 | 24.0 | 2.3 | 3.07 | 32 |
| K | 22 | 74.2 | 22.6 | 3.2 | 3.29 | 23 |

Each of the above hydrolyzed interpolymers was coated onto K cellophane, and thereafter subjected to the polyethylene extrusion coating procedure to apply a polyethylene coating of approximately 1 mil thickness at a polyethylene melt temperature of 490° F.

TABLE 4 (K Cellophane Substrate)

Bond Strength g./in.

| Primer | 24 Hours | 3 Weeks |
|---|---|---|
| No Primer | 0 | 0 |
| Control | 0 | 0 |
| H | 220 | * |
| I | 210 | * |
| J | 315 | 415 |

*measurements not made

EXAMPLE 5

Each of the hydrolyzed interpolymer primers of example 4 was coated onto glassine and thereafter extrusion coated with polyethylene at 490° F. The results of bond measurements appear in table 5.

TABLE 5 (GLASSINE SUBSTRATE)

Bond Strength g./in.

| Primer | 24 Hours | 3 Weeks |
|---|---|---|
| No Primer | 0 | 0 |
| Control | 0 | 0 |
| H | 235 | 325 |
| I | 310 | 370 |
| J | 445 | 475 |
| K | 400 | 460 |

EXAMPLE 6

Each of the hydrolyzed interpolymer primers of example 4 was coated onto aluminum foil and thereafter extrusion coated with polyethylene at 490° F. The results of bond measurements appear in table 6.

TABLE 6 (ALUMINUM FOIL)

Bond Strength g./in.

| Primer | 24 Hours | 3 Weeks |
|---|---|---|
| No Primer | 0 | 0 |
| Control | 0 | 0 |
| H | 375 | 315 |

TABLE 6 (ALUMINUM FOIL) Continued

Bond Strength g./in.

| Primer | 24 Hours | 3 Weeks |
|---|---|---|
| I | 335 | 375 |
| J | 375 | 465 |
| K | 370 | 285 |

EXAMPLE 7

Each of the hydrolyzed interpolymers of example 1 (there designated primers B, C, D, E, and F) was reacted with a polytetramethylene glycol toluene diisocyanate adduct by admixture therewith in the proportion of 46 parts of a 10 percent solution of the adduct and 54 parts of a 10 percent solution of the hydrolyzed interpolymer. Each of of isocyanate-reacted hydrolyzed interpolymer primers (designated B-R, C-R, D-R, E-R, and F-R respectively) was coated onto K Cellophane to provide a coating weight of reacted primer from about 0.3 lb. to about 0.6 lb. per ream. Each of the primed substrates was extrusion coated with polyethylene at a polyethylene melt temperature of 490° F. whereby a polyethylene coating of approximately 1 mil in thickness was bonded to each substrate. Each of the resulting laminates was tested as before for bond strength. The results are tabulated in table 7.

TABLE 7 (K CELLOPHANE SUBSTRATE)

Bond Strength E./in.

| Primer | 24 Hours | 3 Weeks |
|---|---|---|
| No Primer | 0 | 0 |
| Control | 0 | 0 |
| B-R | 325 | 315 |
| C-R | 235 | FT* |
| D-R | 280 | ** |
| E-R | 115 | 255 |
| F-R | 175 | 340 |

*FT is Film Tear which indicates that the bond is stronger than the substrate.

**Measurements not made

Example 8

Each of the hydrolyzed interpolymers of example 7 was reacted as there described, coated onto glassine, and thereafter extrusion coated with polyethylene at 490° F. The results of bond measurements are set forth in table 8.

TABLE 8 (GLASSINE SUBSTRATE)

Bond Strength g./in.

| Primer | 24 Hours | 3 Weeks |
|---|---|---|
| No Primer | 0 | 0 |
| Control | 0 | 0 |
| B-R | 585 | 400 |
| C-R | 490 | 420 |
| D-R | 550 | * |
| E-R | * | * |
| F-R | 500 | 490 |

*Measurements not made

EXAMPLE 9

Each of the hydrolyzed interpolymers of example 7 was reacted as there described, coated onto aluminum foil, and thereafter extrusion coated with polyethylene at 490° F. The bond strength measurements of the resulting construction are tabulated in table 9.

TABLE 9 (Aluminum Foil Substrate)

Bond Strength g./in.

| Primer | 24 Hours | 3 Weeks |
|---|---|---|
| No Primer | 0 | |
| Control | 0 | 0 |
| B-R | 515 | 625 |
| C-R | 520 | * |
| D-R | 450 | 640 |
| E-R | * | * |
| F-R | 515 | * |

*Measurements not made

EXAMPLE 10

Each of the hydrolyzed interpolymers of example 4 (there designated primers H, I, J, and K) was reacted with a polytetramethylene glycol toluene diisocyanate adduct by admixture therewith in the proportion of 46 parts of a 10 percent toluene solution of the adduct and 54 parts of a 10 percent toluene solution of the hydrolyzed interpolymer. Each of the isocyanate reacted hydrolyzed interpolymer primers, designated H-R, I-R, and K-R, was coated onto K Cellophane. Each of the coated substrates was extrusion-coated coated with polyethylene at a polyethylene melt temperature of 490° F. whereby a polyethylene coating of approximately 1 mil thickness was bonded to each substrate. The bond strength of each of the resulting structures appears in table 10.

TABLE 10 (K Cellophane Substrate)

Bond Strength g./in.

| Primer | 24 Hours | 3 Weeks |
|---|---|---|
| No Primer | 0 | 0 |
| Control | 0 | 0 |
| H-R | 230 | 420 |
| I-R | * | * |
| J-R | 215 | 575 |
| K-R | * | * |

Measurements not made

EXAMPLE 11

The procedure of example 10 was followed except the substrate was glassine. The bond strength of the resulting structure appears in table 11.

TABLE 11 (Glassine Substrate)

Bond Strength g./in.

| Primer | 24 Hours | 3 Weeks |
|---|---|---|
| No Primer | 0 | 0 |
| Control | 0 | 0 |
| H-R | 365 | 340 |
| I-R | 270 | 435 |

TABLE 11 (Glassine Substrate)
Continued

Bond Strength g./in.

| Primer | 24 Hours | 3 Weeks |
|---|---|---|
| J-R | 415 | * |
| K-R | 330 | 355 |

*Measurements not made

EXAMPLE 12

The procedure of example 10 was followed except the substrate was aluminum foil. The bond strength of the resulting structures are set forth in table 12.

TABLE 12 (Aluminum Foil Substrate)

Bond Strength g./in.

| Primer | 24 Hours | 3 Weeks |
|---|---|---|
| No Primer | 0 | 0 |
| Control | 0 | 0 |
| H-R | 370 | 315 |
| I-R | 380 | 455 |
| J-R | 430 | 445 |
| K-R | 335 | 315 |

EXAMPLE 13

A hydrolyzed ethylene-vinyl acetate interpolymer primer was provided having the following composition:

| % Hydrolysis | % Ethylene | % Vinyl Acetate | % Vinyl Alcohol | E/VAc | E/VA |
|---|---|---|---|---|---|
| 13 | 80.6 | 18.0 | 1.4 | 4.47 | 58 |

This primer was coated on K Cellophane, Glassine, and aluminum foil respectively, at a coating weight ranging from about 0.3 to about 0.6 lb. per ream. Each of the coated substrates was extrusion coated with about 1 mil of polyethylene at a temperature of 490° F. Bond strength measurements for the resulting laminates are set forth in table 13.

TABLE 13

Bond Strength g./in.

| Substrate | 24 Hours | 3 Weeks |
|---|---|---|
| K Cellophane | 410 | * |
| Glassine | 465 | 545 |
| Aluminum Foil | 575 | 400 |
| Control | 0 | 0 |

*not measured

EXAMPLE 14

The hydrolyzed interpolymer of example 13 was reacted with tetramethylene glycol toluene diisocyanate adduct by admixture therewith in the proportion of 46 parts of a 10 percent toluene solution of the adduct and 54 parts of a 10 percent toluene solution of the hydrolyzed interpolymer. The isocyanate reacted primer was coated onto K Cellophane, glassine, and aluminum foil respectively, and thereafter extrusion coated with polyethylene at a polyethylene melt temperature of 490° F. whereby a polyethylene coating of approximately 1 mil thickness was bonded to each substrate. The bond strength results are set forth in table 14.

TABLE 14

Bond Strength g./in.

| Substrate | 24 Hours | 3 Weeks |
|---|---|---|
| K Cellophane | 285 | 340 |
| Glassine | 460 | 495 |
| Aluminum Foil | 470 | 450 |

EXAMPLE 15

The hydrolyzed ethylene-vinyl acetate interpolymer primer of example 13 was coated onto glassine and onto polyvinylidene chloride-coated polypropylene (available commercially under the trade name "Clysar") at a coating weight of 0.50 lb. per ream respectively. Whenever primer is applied to Clysar herein, it is applied to the polyvinylidene surface. An ethylene vinyl-acetate copolymer of 82 percent ethylene and 18 percent vinyl acetate was extrusion coated onto the primed substrate at a melt temperature of 475° F. The bond strengths are set forth in table 15.

TABLE 15

Bond Strength (Ethylene-Vinyl Acetate Copolymer Coating)

| Substrate | 24 Hours | 2 Weeks |
|---|---|---|
| Glassine | 350 ST | NS |
| Clysar | 250 | 590 ST |

ST-Substrate tear.
NS-Not Separable. It was not possible to separate the ethylene-vinyl acetate coating from the substrate.

EXAMPLE 16

The hydrolyzed ethylene-vinyl acetate interpolymer of example 13 was reacted with polymethyl-polyphenyl isocyanate by admixing 10 percent toluene solutions of each of the reactants in the proportions of 76 percent of hydrolyzed interpolymer and 24 percent of isocyanate. The isocyanate-reacted primer was coated onto glassine and Clysar respectively at a coating weight of 0.5 lb. per ream each. The coated substrate was extrusion coated with the same ethylene-vinyl acetate copolymer as described in example 15 at a melt temperature 475° F. The bond strengths are set forth in table 16.

TABLE 16

Bond Strength

| Substrate | 24 Hours | 2 Weeks |
|---|---|---|
| Glassine | 350 FT. | NS |
| Clysar | 180 | 550 |

EXAMPLE 17

The hydrolyzed ethylene-vinyl acetate interpolymer primer of example 13 was coated onto glassine at a coating weight of 0.5 lb. per ream. Polypropylene was extrusion coated onto the coated substrate at a melt temperature of 560° F. The bond strength obtained was as follows:

BOND STRENGTH

| 48 Hours | 2 Weeks |
|---|---|
| Not Separable | Not Separable |

It is noted that it is customary in the art to extrusion coat with polypropylene at a melt temperature of at least about 600° F.

EXAMPLE 18

The hydrolyzed ethylene-vinyl acetate interpolymer of example 13 was reacted with polytetramethylene glycol toluene diisocyanate by admixture therewith in the proportion of 54 parts of a 10 percent toluene solution of hydrolyzed interpolymer and 46 parts of a 10 toluene solution of the diisocyanate. The isocyanate-reacted hydrolyzed interpolymer was coated onto each of the following substrates: pouch paper, K Cellophane, A Mylar, polypropylene, and Clysar. Each coated substrate was extrusion coated with the same ethylene-vinyl acetate copolymer described in example 15 at a melt temperature of 425° F. The bond strengths, measured by means of an Amthor tensile tester (similar in operation to an Instron tensile tester) were as follows:

BOND STRENGTH

| Substrate | 24 Hours | 3 Weeks |
|---|---|---|
| Pouch Paper | Fiber Tear | 280 |
| K Cellophane | Substrate Tear | 150 |
| Polypropylene | Substrate Tear | Fiber Tear |
| A Mylar | Substrate Tear | 850+Substrate Tear |
| Clysar | Substrate Tear | * |

*no measurement made

EXAMPLE 19

The hydrolyzed interpolymer of example 13 was reacted with tetramethylene glycol toluene diisocyanate adduct by admixture therewith in the proportion of 45.75 parts of 10 percent toluene solution of the adduct and 54.25 parts of a 10 percent toluene solution of the hydrolyzed interpolymer. The isocyanate reacted primer was coated onto uncoated cellophane and the coated cellophane was thereafter extrusion-coated with polyethylene at a polyethylene melt temperature of 480° F. whereby a polyethylene coating of approximately 2 mils thickness was bonded to the substrate. The resultant structure was tested as before or bond strength with the results as set forth below:

BOND STRENGTH g./in.

| Substrate | 1 Week | 4 Weeks | 6 Weeks |
|---|---|---|---|
| Uncoated Cellophane | FT | 370 | 500 |

EXAMPLE 20

The hydrolyzed interpolymer of example 13 was reacted with polymethylene polyphenyl isocyanate by admixture therewith in the proportion of 10.4 parts of a 10 percent toluene solution of the isocyanate and 89.6 parts of a 10 percent toluene solution of the hydrolyzed interpolymer. The isocyanate reacted primer was coated onto uncoated cellophane and the primed cellophane was thereafter extrusion coated with polyethylene at a polyethylene melt temperature of 480° F. whereby a polyethylene coating of approximately 2 mils was bonded to the substrate. The resultant structure was tested for bond strength with the results as set forth below:

BOND STRENGTH g./in.

| Substrate | 1 Week | 2 Weeks | 4 Weeks | 6 Weeks |
|---|---|---|---|---|
| Uncoated Cellulphane | 435 | 735 | 440 | 545 |

EXAMPLE 21

The iscocyanate reacted interpolymer of example 14 was coated onto nylon film at a coating weight of 0.55 lb./ream. An ethylene-vinyl acetate copolymer of 91 percent by weight of ethylene and 9 percent by weight of vinyl acetate was extrusion coated onto the primer substrate at a melt temperature of 475° F. The bond strength of the resultant structure is set forth below:

BOND STRENGTH g./in.

| Substrate | 1 Day (24 Hours) | 1 Month |
|---|---|---|
| Nylon | 950 | 860 |

EXAMPLE 22

The hydrolyzed interpolymer of example 13 was coated onto Mylar, aluminum foil, and K Cellophane respectively, at a coating weight of 0.5 lb./ream. Polypropylene was extrusion coated onto each of the primer substrates at a melt temperature of 560° F. The bond strength of each of the resultant structures is set forth below.

BOND STRENGTH g./in.

| Substrate | 2 Days | 1 Week | 2 Weeks |
|---|---|---|---|
| Mylar | 155 | 400 | 280 |
| Aluminum Foil | 350 | 390 | 200 |
| K Cellophane | 285 | 360 | 270 |

EXAMPLE 23

The isocyanate reacted interpolymer of example 14 was coated onto uncoated Cellophane, aluminum foil, and polyvinylidene chloride-coated nylon (available commercially under the trade name Capran 77K) respectively at a coating weight of 0.35 lb./ream. An ethylene-vinyl acetate copolymer of 82 percent of ethylene and 18 percent of vinyl acetate was extrusion coated onto each of the primed substrates at a melt temperature of 450° F. The bond strength of each of the resultant structures is set forth below:

BOND STRENGTH g./in.

| Substrate | Initial | 4 Hours | 16 Hours |
|---|---|---|---|
| Uncoated Cellophane | 80 | 320 | 360 |
| Aluminum Foil | 140 | | 900 |
| Capran 77K | 640 | | 1700 |

EXAMPLE 24

The isocyanate reacted interpolymer of example 14 was coated onto Capran 77K and Saran coated Mylar respectively at a coating weight of 0.3 lb./ream. An ionomer of ethylene-acrylic acid copolymer (available commercially under the trade name "Surlyn 1602") was extrusion coated onto each of the primed substrates at a melt temperature of 515° F. The bond strength of each of the resultant structures is set forth below:

BOND STRENGTH g./in.

| Substrate | 130 Hours |
| --- | --- |
| Capran 77K | 400 |
| Mylar | NS |

EXAMPLE 25

The following hot melt compositions, designated HM-A, HM-B, HM-C, comprising polyolefin and wax, were prepared by thoroughly blending the ingredients identified below in the indicated proportions:

|  | HM-A | HM-B | HM-C |
| --- | --- | --- | --- |
| Ethylene-vinyl acetate coplymer (72% ethylene, 28% vinyl acetate) | 70% | 60% | 50% |
| Paraffin (melting range 150°–155° F.) | 30% | 40% | 50% |

The hydrolyzed interpolymer of example 13 was reacted with tetramethylene glycol toluene diisocyanate by admixture therewith in the proportion of 10 parts of a 6% toluene solution of the interpolymer and 1 part of a 46% toluene solution of the isocyanate. The isocyanate-reacted primer was coated onto glassine and aluminum foil respectively at a coating weight of 0.3 lb./ream to provide primed substrates. Each of the hot melt compositions was coated onto each of the primed substrates at a hot melt temperature ranging from 400° F. to 425° F. Here, the control was provided by coating the same hot melt compositions on the same substrates in exactly the same manner with the exception that no primer was used. After cooling, each structure was tested for bond strength with the following results:

BOND STRENGTH g./in.

| Substrate | HM-A | HM-B | HM-C |
| --- | --- | --- | --- |
| Glassine, with primer | 1000 | NS | 1000 |
| Glassine, Control | 200 | 440 | 310 |
| Aluminum Foil, with primer | 1000 | 1000 | 1000 |
| Aluminum Foil, Control | 195 | 350 | 460 |

EXAMPLE 26

Ethylene-vinyl acetate copolymer of 67 percent by weight of ethylene and 33 percent by weight of vinyl acetate was hydrolyzed by the aforedescribed hydrolysis procedure to provide a 13 percent hydrolyzed ethylene-vinyl acetate interpolymer primer having the following composition:

| % Hydrolysis | % Ethylene | % Vinyl Acetate | % Vinyl Alcohol | E/VAc | E/VA |
| --- | --- | --- | --- | --- | --- |
| 13 | 69.1 | 28.6 | 2.3 | 2.41 | 30.0 |

The hydrolyzed interpolymer was coated onto K Cellophane, glassine, and aluminum foil respectively and thereafter extrusion coated with polyethylene at a melt temperature of 500° F. The bond strengths obtained and that of a polyethyleneimine control were as follows:

BOND STRENGTH g./in.

| Substrate | 24 Hours | 3 Weeks |
| --- | --- | --- |
| K Cellophane | 200 | 170 |
| Glassine | 300 | 230 |
| Aluminum Foil | 250 | 280 |
| Control | 0 | 0 |

Although polyethyleneimine, a commercially used primer, was used as the control in the above examples, controls were also prepared substituting a nonhydrolyzed version of the hydrolyzed interpolymer for the hydrolyzed interpolymer. The hydrolyzed interpolymer almost invariably gave a marked improvement on the order of 50 to 300 grams per inch in adhesion compared with the nonhydrolyzed interpolymer primer under the test conditions of the Instron tester. The preferred interpolymers contain from about 15 to about 30 percent by weight units derived from the ester monomer.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the materials and method steps will readily occur to those skilled in the art, within the spirit of the invention and the scope of the appended claims.

All percentages given herein are by weight unless otherwise indicated.

We claim:

1. A method of adhering a hot melt olefin polymer coating composition as a film to a substrate wherein the coating composition contains an olefin polymer susceptible to oxidation or degradation at the elevated melt temperature required to secure the coating to the substrate by direct extrusion from a melt, which method comprises applying to the surface of the substrate a primer comprising a hydrolyzed copolymer of an olefin monomer and a vinyl alcohol ester monomer in which the ratio on a weight basis of hydrolyzed ester to olefin is at least 1:70 so as to coat the substrate surface, and applying the olefin polymer coating material to the primed surface from a hot melt significantly below the oxidation and degradation temperatures of said olefin polymer coating composition, said hot melt temperature being no higher than 560° F., to form a tightly adherent film thereon.

2. The method of claim 1 wherein said coating material is selected from the class consisting of polyethylene, polypropylene and copolymers and terpolymers of ethylene or propylene with each other or with a monomer selected from the class consisting of vinyl alcohol and its esters, acrylic acid and substituted acrylic acid and its esters, vinyl chloride, lower olefins in the $C_2$ to $C_6$ range, and halogen containing lower olefins, and ionomers of said copolymers and terpolymers.

3. The method of claim 1 wherein the resulting product has a bond tensile strength between coating and substrate which is at least 50 grams per inch better than the bond resulting from use of the unhydrolyzed counterpart of said hydrolyzed copolymer in lieu of the hydrolyzed copolymer of the primer.

4. The method of claim 1 wherein said copolymer is cross linked with an isocyanate in an amount sufficient to improve the chemical resistance of the bond.

5. The method of claim 1 wherein said copolymer contains between 8 and 50 percent by weight of units of said ester and the remainder being said olefin.

6. The method of claim 1 in which said primer is applied in an amount of 0.1 to 1.5 pounds of the hydrolyzed copolymer per 3000 square feet of substrate surface.

7. The method of claim 1 wherein the olefin polymer coating material is applied in a thickness of up to about 2 mils.

8. The method of claim 1 wherein the olefin polymer coating material is polyethylene applied by extruding from the hot melt at a temperature in the range of from about 375° F. to about 560° F.

9. The method of claim 1 wherein said primer is applied to the surface of the substrate in the proper amount creating a bond strength of at least about 200 grams per inch on the Instron tensile tester.

UNITED STATES PATENT OFFICE
CERTIFICATE OF CORRECTION

Patent No. 3,616,191　　　　　Dated October 26, 1971

Inventor(s) James J. Fuerholzer

It is certified that error appears in the above-identified patent and that said Letters Patent are hereby corrected as shown below:

Column 4, line 21, delete "100°" and substitute --110°--.

Column 5, line 9, delete "branches" and substitute --branched--.

Column 10, line 16, first column under "3 weeks" insert --0--.

Column 10, line 37, delete "coated".

Column 15, line 19, delete "coplymer" and substitute --copolymer--.

Signed and sealed this 28th day of November 1972.

(SEAL)
Attest:

EDWARD M. FLETCHER, JR.
Attesting Officer

ROBERT GOTTSCHALK
Commissioner of Patents